US010873790B2

United States Patent
Brockhaus et al.

(10) Patent No.: US 10,873,790 B2
(45) Date of Patent: Dec. 22, 2020

(54) MEASURING DEVICE, TRANSMITTER HOUSING AND METHOD FOR PRODUCING A MEASURING DEVICE

(71) Applicant: KROHNE Messtechnik GmbH, Duisburg (DE)

(72) Inventors: Helmut Brockhaus, Oberhausen (DE); Achim Matt, Duisburg (DE)

(73) Assignee: KROHNE MESSTECHNIKGMBH, Duisburg (DE)

( * ) Notice: Subject to any disclaimer, the term of this patent is extended or adjusted under 35 U.S.C. 154(b) by 0 days.

(21) Appl. No.: 16/027,720

(22) Filed: Jul. 5, 2018

(65) Prior Publication Data

US 2019/0014391 A1 Jan. 10, 2019

(30) Foreign Application Priority Data

Jul. 7, 2017 (DE) .................. 10 2017 115 260

(51) Int. Cl.
*G08B 23/00* (2006.01)
*H04Q 9/00* (2006.01)
(Continued)

(52) U.S. Cl.
CPC ............... *H04Q 9/00* (2013.01); *G01D 4/002* (2013.01); *G01D 11/24* (2013.01); *G01D 11/245* (2013.01); *H04Q 2209/88* (2013.01)

(58) Field of Classification Search
CPC ...... G01D 11/24; G01D 11/245; G01D 4/002; H04Q 2209/88; H04Q 9/00
(Continued)

(56) References Cited

U.S. PATENT DOCUMENTS 8,100,706 B2 1/2012 Matsuzawa et al.
9,030,190 B2 * 5/2015 Matt .................... G01D 11/245
324/156
(Continued)

FOREIGN PATENT DOCUMENTS

DE    102005046331 A1    3/2007
DE    10 2009 048 554 A1    4/2011
(Continued)

OTHER PUBLICATIONS

Norbert Löhr, FlowCad, NEXTRA®; Apr. 27, 2012; www.FlowCad.de.
(Continued)

*Primary Examiner* — Naomi J Small
(74) *Attorney, Agent, or Firm* — David S. Safran; Roberts Calderon Safran & Cole, P.C.

(57) ABSTRACT

A measuring device with at least one sensor and at least one transmitter housing, the transmitter housing having at least one terminal space and an electronics space adjacent to the terminal space and connected via a partition wall, wherein at least a first electronic device for connecting supply and/or I/O lines is arranged in the terminal space and at least a second electronic device is arranged in the electronics space with electronics for controlling the sensor. The first and second electronic devices are electrically conductively connected to one another via a contacting unit. The second electronic device has a terminal unit which is connected to the contacting unit via a plug connection hat has a joining direction. The terminal unit is fixedly arranged in the joining direction and to float perpendicular to the joining direction such that it adapts to the position of the contacting unit when connecting to the contacting unit.

11 Claims, 6 Drawing Sheets

(51) Int. Cl.
  *G01D 11/24* (2006.01)
  *G01D 4/00* (2006.01)
(58) Field of Classification Search
  USPC .................................................... 340/870.02
  See application file for complete search history.

(56) References Cited

U.S. PATENT DOCUMENTS

| | | | |
|---|---|---|---|
| 9,203,184 B1* | 12/2015 | Hui .................... | H01R 13/629 |
| 9,479,201 B2 | 10/2016 | Larson et al. | |
| 9,819,107 B2 | 11/2017 | Logan, Jr. et al. | |
| 2005/0193839 A1* | 9/2005 | Gronvall .............. | G01N 29/223 |
| | | | 73/866.5 |
| 2007/0277604 A1 | 12/2007 | Cudini et al. | |
| 2010/0318306 A1* | 12/2010 | Tierney ................ | G01R 22/063 |
| | | | 702/62 |
| 2011/0132635 A1* | 6/2011 | Lesieur ................. | H02G 5/007 |
| | | | 174/68.2 |
| 2012/0055274 A1* | 3/2012 | Hershey ................ | G01D 11/24 |
| | | | 73/866.3 |
| 2012/0125130 A1* | 5/2012 | Stoll ..................... | G01K 13/02 |
| | | | 73/866.5 |
| 2014/0162488 A1* | 6/2014 | Staudigel .............. | H01R 13/62 |
| | | | 439/372 |
| 2015/0268066 A1* | 9/2015 | Rosenegger ......... | G01D 11/245 |
| | | | 324/207.15 |
| 2015/0274010 A1* | 10/2015 | Roth .................... | F16J 15/025 |
| | | | 220/86.2 |
| 2016/0381822 A1 | 12/2016 | Hausler et al. | |
| 2018/0182387 A1* | 6/2018 | Chua .................... | G06F 3/167 |

FOREIGN PATENT DOCUMENTS

| | | |
|---|---|---|
| DE | 10 2013 209 839 A1 | 11/2014 |
| DE | 10 2014 117 536 A1 | 6/2016 |
| EP | 1 575 344 A1 | 9/2005 |
| JP | 2007-280839 A | 10/2007 |
| WO | 2017/003631 A1 | 1/2017 |

OTHER PUBLICATIONS

IEC CEI 60664-1, International Standard, International Electrotechnical Commission, Basic Safety Publication, Insulation Coordination for Equipment Within Low-Voltage Systems—Part 1 Principles, Requirements and Tests, Second Edition, Apr. 2007, English Version of the Table of Contents and Machine Translation of Relevant Parts.

IEC 61010-1, International Standard, International Electrotechnical Commission, Group Safety Requirements for Electrical Equipment for Measurment, Control, and Laboratory Use—Part 1: General Requirements, Edition 3L.0, Jun. 2010, English Version of the Table of Contents and Relevant Parts Are Table 6 on p. 55 and Table 7 on p. 56, Which Can Be Understood Without Translation.

IEC 60079-11, International Standard, International Electrotechnical Commission, Explosive Atmospheres—Part 11, Equipment Proteciton by Intrinsic Safety "I", Edition 6.0, Jun. 2011, English Version of the Table of Contents as Well as a Machine Translation of the Relevant Parts.

\* cited by examiner

MEASURING DEVICE, TRANSMITTER HOUSING AND METHOD FOR PRODUCING A MEASURING DEVICE

BACKGROUND OF THE INVENTION

Field of the Invention

The invention is based on a measuring device with at least one sensor and with at least one transmitter housing, wherein the transmitter housing has at least one terminal space and an electronics space adjacent to the terminal space and connected via a partition wall, wherein at least a first electronic device for the connection of supply and/or I/O lines is arranged in the terminal space and wherein at least a second electronic device is arranged in the electronics space with electronics for controlling the sensor, wherein the first electronic device and the second electronic device are electrically conductively connected to one another via a contacting unit, wherein the second electronic device has a terminal unit which is connected to the contacting unit via a plug connection, wherein the plug connection has a joining direction.

Furthermore, the invention relates to a transmitter housing and a method for producing a measuring device, wherein the measuring device has at least one sensor and at least one transmitter housing, wherein the transmitter housing has at least one terminal space and an electronics space adjacent to the terminal space and connected via a partition wall, wherein at least a first electronic device for the connection of supply and/or I/O lines is arranged in the terminal space and wherein at least a second electronic device is arranged in the electronics space with electronics for controlling the sensor, wherein the second electronic device arranged in the electronics space has a terminal unit, wherein a contacting unit is provided, which is fixedly connected to the first electronic device, wherein the contacting unit has contact elements in the form of network contact elements and/or signal contact elements for transmitting electrical signals and wherein the terminal unit has connecting elements in the form of network connecting elements and/or signal connecting elements.

Description of Related Art

Measuring devices are known from the prior art which, in addition to a sensor unit for recording physical or chemical measured variables, have a modular electronic unit for controlling and supplying the sensor unit and for forwarding and/or evaluating the recorded measured data. Usually, the electronic device is arranged in a housing. In this case, depending on the field of application of the measuring device, in particular the type of explosion risk, different requirements are placed on the housing and/or on the design of the electronic device to prevent the formation and/or propagation of an explosion.

The following types of protection for electrical equipment are relevant in the context of the invention:

"Ex-e" means the requirement for the construction of equipment subject to increased safety. Measures are taken to prevent sparks from forming in internal or external parts of electrical components. Such measures are, for example, over-dimensioning of critical points, increased operating and basic insulation, overload protection, safe connection of incoming lines and/or adequate mechanical protection.

"Ex-i" refers to the requirements for the intrinsic safety of circuits or the limitation of energy in electrical circuits. This includes, in particular, that an intrinsically safe circuit is separated with a sufficient distance from other circuits. The distance between two circuits corresponds to the shortest path between these circuits. A distinction is always made by the type of medium through which the path of the shortest distance leads, so that there are different minimum distances for air gaps, distances through casting compound, distances through solid insulation, creepage distances in air or creepage distances under protective layer.

To determine the minimum distances to be observed, reference is made to the standards IEC 60664-1: 2007, IEC 61010-1: 2010 and IEC 60079-11: 2011, the contents of which are expressly incorporated into the present application.

"Ex-d" refers to the requirement for the design of a housing as pressure-resistant casing, wherein explosions are allowed under this type of protection inside the housing, however their impact on the surroundings should be prevented by a pressure-resistant design of the housing.

In the context of the present invention, a distinction is made between designs that meet the requirements for ensuring an explosion-proof measuring device, and further between designs that are suitable for use in an environment that is not at risk for explosions.

In the context of the present invention, a modular electronic unit for controlling and supplying the sensor unit as well as for forwarding and/or evaluating the recorded measurement data comprises both the electronics for operating the sensor and terminals for supply and I/O lines, i.e. input/output lines. Usually, these two units are arranged in separate chambers.

In detail, the electronics for operating the sensor are arranged in an electronics space. Furthermore, the electronics space can have a connection to the sensor unit of the measuring device.

The terminals for supply and I/O lines are arranged in a terminal space. By separating the two spaces, explosions resulting in the electronics space can be prevented, in particular, from propagating unhindered in the terminal space.

The second electronic device arranged in the electronics space and the first electronic device arranged in the terminal space are connected to one another in measuring devices known from the prior art by means of a contacting unit, wherein both power and electrical signals are transmitted in the form of voltages via the contacting unit.

A control device with an electronic device in the form of a printed circuit board is known from European Patent Application EP 1 575 344 A1, wherein the printed circuit board is configured as a multilayered, bendable, in particular rigid-flex printed circuit board.

German Patent Application DE 10 2014 117 536 A1 discloses a sensor with two printed circuit boards, wherein the printed circuit boards are connected to one another via side contact elements at an angle. For this, the printed circuit boards in the edge region have contact surfaces which are connected to the side contact elements. The side contact elements also have a bend, so that the circuit boards are arranged at an angle to one another.

SUMMARY OF THE INVENTION

Based on this prior art, the object of the present invention is to provide a measuring device and a transmitter housing, which is easy to produce and whose components can be particularly easily replaced. In addition, the object of the invention is to provide a method for producing such a measuring device.

According to a first teaching of the present invention, the aforementioned object is achieved by a measuring device mentioned in the introduction, in that the terminal unit is fixedly arranged in the joining direction and that the terminal unit is arranged to float perpendicular to the joining direction, that in or during the connection to the contacting unit, they adapt to the position of the contacting unit. Thus, the connection is designed as a self-centering connection.

According to the invention, it has been recognized that when the terminal unit is arranged to float perpendicular to the joining direction so that it adapts to the position of the contacting unit during the process of connection to the contacting unit, a connection between the contacting unit and the terminal unit can be produced particularly easily and also be removed again. This type of connection is advantageous, especially in tight spaces.

According to a first design, the terminal unit is arranged to float in a holder. In this case, the holder is preferably designed such that it attaches the terminal unit in the joining direction and furthermore has a sufficient tolerance range with respect to the exact position of the terminal unit perpendicular to the joining direction, preferably between 0.2 and 0.5 mm, particularly preferably between 0.2 and 0.3 mm.

According to a preferred design, the terminal unit has connecting elements in the form of network connecting elements and/or signal connecting elements for transmitting electrical signals. The connecting elements are preferably arranged in pairs.

According to one design, the network connecting elements have a larger cross-section compared to the signal connecting elements.

The terminal unit is preferably connected via the connecting elements in an electrically conductive manner to the contacting unit. For this, the contacting unit particularly preferably has contact elements in the form of network contact elements and/or signal contact elements which are connected to the connecting elements.

According to a next design, the connecting elements are designed at least partially as pins or sockets, particularly preferably as funnel-shaped sockets. The design of the connecting elements as funnel-shaped sockets has the advantage that connection partners designed as pins can be caught when connecting the terminal unit and the contacting unit, so that the connection of the terminal unit and the contacting unit is particularly simple. If the connecting elements are configured at least partially as preferably funnel-shaped sockets, the connection between the sockets and the pins connected to the sockets has a sufficient tolerance range, preferably between 0.2 and 0.5 mm and particularly preferably between 0.2 and 0.3 mm.

According to one design, the opening of the funnel-shaped sockets has a diameter between 0.2 and 0.5 mm and particularly preferably between 0.2 and 0.3 mm, with the neck of the funnel-shaped sockets tapering at least in sections.

According to a further design, the contact elements of the contacting unit are designed as corresponding connection partners of the connecting elements. If the connecting elements are designed as pins, then the contact elements are designed accordingly as sockets, preferably as funnel-shaped sockets. If the connecting elements are designed as sockets, preferably as funnel-shaped sockets, then the contact elements are designed as pins.

It is also advantageous when the terminal unit has means for increasing the distance, in detail for increasing the creepage distances, for example at least one recess, in particular at least one hole and/or at least one slot between the network connecting elements and the signal connecting elements and/or between the signal connecting elements with one another and/or between the network connecting elements with one another. In this case, the at least one hole and/or the at least one slot is preferably introduced by means of milling in the terminal unit. The at least one hole may be circular and/or have any other geometry adapted to the use. In addition, the at least one slot may be bent or straight and in particular have any geometry adapted to the use. In particular, at least one connecting element can be completely enclosed by a recess.

According to this design, the separating distances between the individual contact elements required to guarantee an explosion-protected component can also be guaranteed in confined spaces.

According to a next design, the signal connection elements are arranged in a circular manner in at least one circle around at least one network connecting element.

As a result of the circular arrangement, according to a preferred design, it is ensured that, given a correspondingly selected radius of the circle, all signal connecting elements maintain the required minimum distance to the at least one network connecting element to ensure explosion safety.

In addition, it is also conceivable and advantageous when the signal connecting elements are arranged in a different geometric shape around at least one network connecting element.

Particularly preferably, the signal connecting elements are arranged in at least two circles with different radius or distance to the at least one network connecting element. In this case, preferably all signal connecting elements have the required minimum distance for ensuring explosion safety to the network connecting elements.

For example, it may also be provided that at least one distance between at least one signal connecting element and a network connecting element and/or at least one distance between two signal connecting elements is less than the minimum distance required to ensure explosion protection. Although such a design can only be used in a non-hazardous environment, the advantage of this design is that a particularly large number of connecting elements are available for signal transmission in limited space. For example, Gigabit Ethernet connections can also be implemented in a small space.

According to one design, the terminal unit has at least 15 contact elements. According to the next design, the terminal unit has at least 22 contact elements.

According to a next advantageous design, the signal connecting elements are combined into at least one circuit group, wherein the at least one circuit group has at least two signal connecting elements. The advantage of this design is that interconnected conductor tracks can be guided closely next to one another in or on the second electronic device. At least two spatially separated circuit groups are especially preferred. The distance between the circuit groups, i.e., the smallest distance between the signal connecting elements of the different circuit groups, corresponds at least to the standardized minimum distance to ensure explosion safety.

According to a further design, the terminal unit is designed such that within at least one circuit group or between at least two circuit groups, at least one distance between two signal connecting elements falls below the standardized minimum distance to maintain the air and/or creep resistance. This design is only suitable for use in non-hazardous environments, but has the advantage that many connecting elements can be provided in particularly confined spaces.

According to a next design, the terminal unit is covered with an insulating material to protect the user and/or to improve the separation to the other electronic components arranged in the electronics space.

According to one design, the insulation is designed as a cap which is connected to the terminal unit via a click-on connection.

According to an advantageous design, the first electronic device comprises a first circuit board and/or the second electronic device comprises a second circuit board.

It is particularly preferred that the shape of the first electronic device is at least partly adapted to the inner shape of the terminal space and/or the shape of the second electronic device is at least partly adapted to the inner shape of the electronics space. If the transmitter housing has a circular cross-section at least in the area of the terminal space and/or the electronics space, the first and/or second electronic device preferably also has/have the shape of a circle or a circular section, in particular a semicircle.

Furthermore, it is advantageous when the second electronic device is designed as an at least partially bendable printed circuit board. For example, the circuit board can be designed as a flex circuit board or as a rigid-flex circuit board or as a semi-flex circuit board or as a TWINflex® circuit board. The printed circuit board has at least two rigid printed circuit board parts and at least one bendable part that connects the at least two rigid printed circuit board parts together. The terminal unit is particularly preferably designed as a rigid part of the flexible printed circuit board and at least one rigid part is designed as a mounting unit for the electronics arranged in the electronics space. Furthermore, it is advantageous when the at least two rigid parts of the flexible printed circuit board comprise an angle, preferably an angle between 90° and 180° or between 90° and 160° or a 90° angle or an angle between 45° and 90°. All in all, the transmitter housing can be designed to be particularly compact.

According to a further particularly preferred design, the flexible printed circuit board comprises internal conductor tracks. To ensure explosion protection, smaller requirements are placed on the distances between internal conductor tracks. In this respect, an explosion-proof measuring device can be provided which simultaneously provides a high number of signal transmitting elements in a small space.

The electronics arranged in the electronics space for controlling the sensor is preferably designed as a compact device insert, which is connected to the second electronic device via plug connections. A compact device insert can, for example, comprise stacked assembled printed circuit boards that are connected to the second electronic device by means of a plug connection. The advantage of this design is that the entire electronics are particularly easy to replace as an assembly.

According to a further design, the second electronic device is removable, for example by means of a screw connection to the transmitter housing. Furthermore, a safe connection between the second electronic device and the transmitter housing is preferably provided. A safe connection is preferably implemented by a conductive connection of the ground potential of the second electronic device to the transmitter housing.

According to a next design, the first electronic device preferably has at least one terminal element for contacting the network terminal and at least one contact element for contacting the signal transmitting elements. The aforementioned terminal elements are preferably designed as terminals.

According to a further design, the first electronic device and the terminal space are configured such that the connection cables in the terminal space running to the terminal elements during operation of the measuring device can be mechanically stabilized by having sufficient space.

According to a further advantageous design, the first electronic device and/or the terminal elements, for example, in the form of terminals, is/are at least partially covered with an insulating material. This ensures that even if the user opens the terminal space, there is sufficient protection for the electronic connections.

According to a further advantageous design, the contacting unit is designed as an electrical feedthrough element, preferably as a plug with contact elements glazed or molded in plastic, in particular wherein the plug is enclosed in a metal cylinder. A glass/metal feedthrough element is advantageously suitable for use in potentially explosive environments. A feedthrough element made of plastic is suitable for use in non-hazardous environment.

According to a next advantageous design, the contacting unit has the contact elements in the form of network contact elements and/or signal contact elements for transmitting electrical signals. The contact elements can be configured as pins or as sockets. The contact elements are preferably arranged in pairs.

It is advantageous when the network contact elements and/or the signal contact elements are at least partially firmly bonded to the first electronic device. For example, the contact elements can be soldered to the first electronic device.

It is also advantageous when the contact elements are arranged within a protective collar, whereby ignition protection of the measuring device can be increased.

It is particularly preferred that the detachable contact element is inserted in the recess of the partition wall.

According to a preferred design, the first electronic device is removably connected to the transmitter housing via at least one fastening means. For example, the first electronic device is screwed to the transmitter housing. Preferably, at least one screw or other fastening means or at least two screws or two other fastening means are arranged directly next to the contacting unit in order to hold the contacting unit in a stabilizing manner. The screws or other fastening means are in direct contact with the contacting unit and/or touch the contacting unit. In addition, at least one connection between the first electronic device and the transmitter housing is preferably designed as a secure connection to the housing. For this purpose, the first electronic device, in particular the ground potential of the first electronic device, is preferably electrically conductively connected to the transmitter housing.

In principle, the transmitter housing can be designed in such a way that the electronics space or the elements arranged in the electronics space and the terminal space or the elements arranged in the terminal space meet the requirements of the same ignition protection classes or different ignition protection classes.

For example, both the electronics space and the terminal space can meet the requirements for contact protection and electromagnetic compatibility without being suitable for use in potentially explosive atmospheres.

In addition, both the electronics space and the terminal space can meet the requirements with respect to protection against accidental contact and electromagnetic compatibility, whereby the electronics space is additionally pressure-resistant (Ex-d) and the terminal space meets the requirements of increased safety (Ex-e).

Furthermore, both the electronics space and the terminal space can meet the requirements for contact protection and electromagnetic compatibility, whereby the electronics space is additionally pressure resistant (Ex-d) and a safe separation between Ex-e signals (mains voltage) and Ex i Signals (I/O connection) is guaranteed.

In addition, both the electronics space and the terminal space can meet the requirements with respect to contact protection and electromagnetic compatibility and, in addition, pressure resistance (Ex-d).

Finally, both the electronics space and the terminal space can meet the requirements with respect to contact protection and electromagnetic compatibility and additionally pressure resistance (Ex-d), wherein the contacting unit is not designed to be pressure resistant.

According to a second teaching of the present invention, the object derived at the outset is achieved by a transmitter housing, wherein the transmitter housing has at least one terminal space and an electronics space adjacent to the terminal space and connected via a partition wall, wherein at least one first electronic device for the connection of supply and/or I/O lines is arranged in the terminal space and wherein at least a second electronic device is arranged in the electronics space with electronics for controlling the sensor, wherein the first electronic device and the second electronic device are electrically conductively connected to one another via a contacting unit, wherein the second electronic device has a terminal unit which is connected to the contacting unit via a plug connection, wherein the plug connection has a joining direction. The transmitter housing is characterized in that the terminal unit is fixedly arranged in the joining direction and that the terminal unit is arranged to float perpendicular to the joining direction such that it adapts to the position of the contacting unit when connecting to the contacting unit and that the transmitter housing is designed for use in a measuring device described above.

According to a next teaching of the present invention, the object described at the outset is achieved by a method described at the outset for producing a measuring device, in that the method comprises the following steps:
- installing the second electronic device in the electronics space, wherein the terminal unit is arranged to float,
- installing the first electronic device in the terminal space, wherein the contacting unit is removably inserted into the partition wall,
- wherein the contacting unit is connected to the terminal unit by installing the first electronic device,
- wherein the terminal unit adapts by self-centering to the position of the contacting unit.

Due to the self-centering connection between the terminal unit and the connecting element, the method according to the invention has the advantage that such a measuring device is particularly easy to install.

The measuring instrument produced in this manner is preferably designed according to one of the designs described above.

In detail, there is now a plurality of possibilities for designing and further developing the measuring device according to the invention, the transmitter housing and the method according to the invention as will be apparent from the following description of preferred embodiments in conjunction with the drawings.

DETAILED DESCRIPTION OF THE INVENTION

Figure 1:
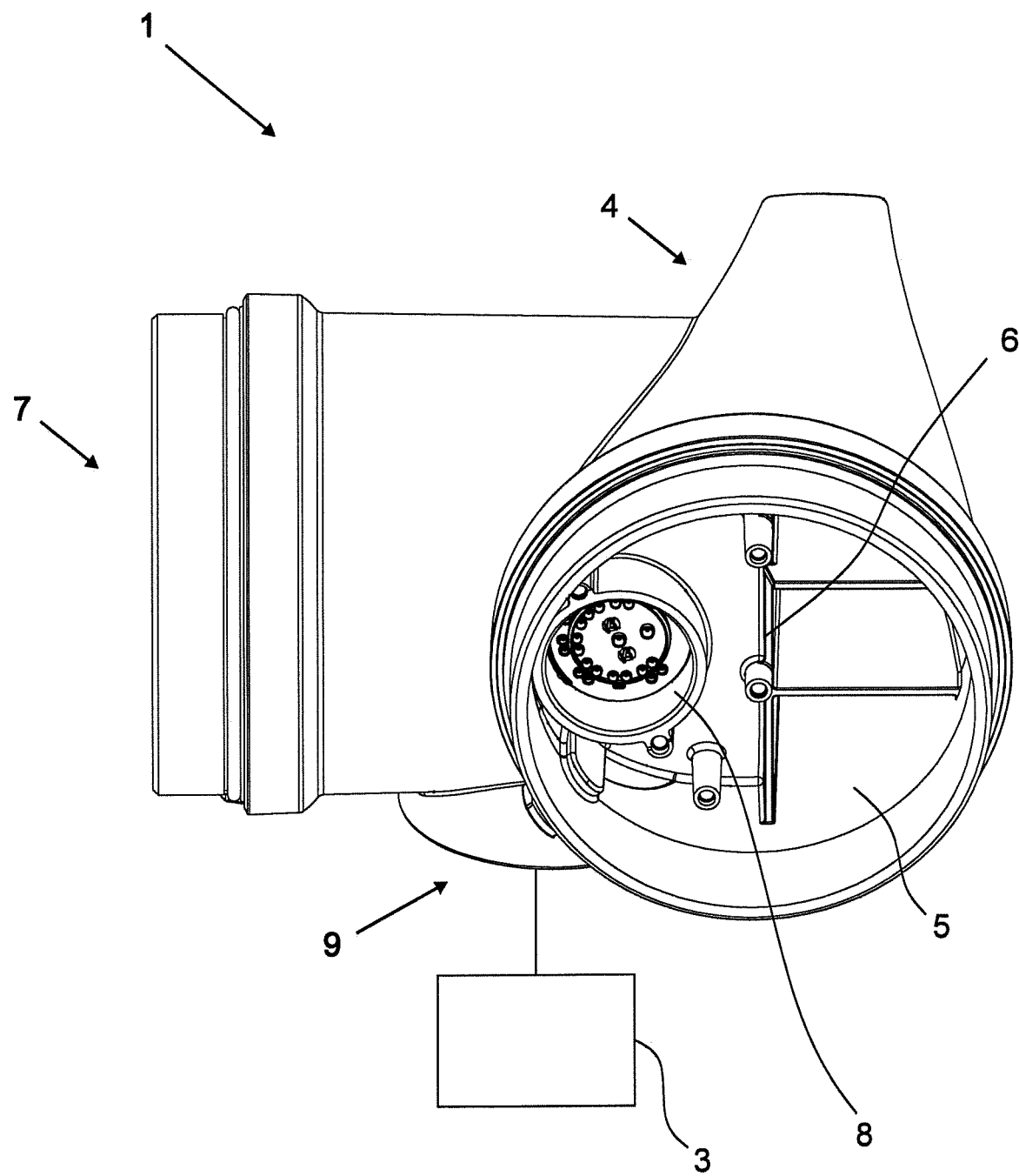
FIG. 1 is a perspective view of a first embodiment of a measuring device.

FIG. 1 shows a representation of a measuring device 1 with a sensor 3 for receiving a physical measured variable and with a transmitter housing 4. The transmitter housing 4 comprises a terminal space 5 and an electronics space 7 adjacent to the terminal space 5 and connected via a partition wall 6, wherein no electronic device is arranged in the shown terminal space 5. The partition wall 6 has a recess 8 to accommodate a contacting unit. In addition, the electronics space 7 has a connection area 9, through which the second electronic device arranged in the electronics space is connected to the sensor 3.

Figure 2:
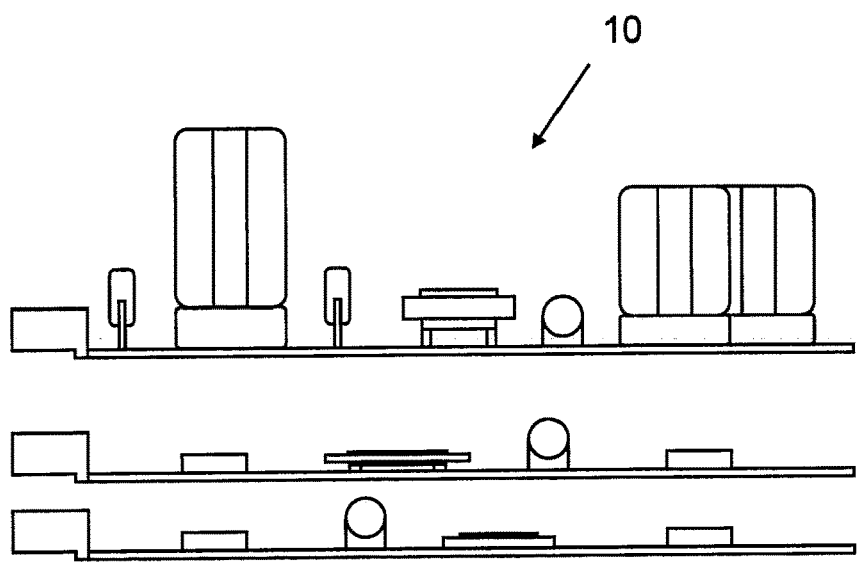
FIG. 2 is a side view a first embodiment of an electronic device insert.

FIG. 2 shows an embodiment of an electronics assembly 10, whereby the electronic components shown are designed to control the sensor 3. The electronics assembly 10 is designed as a component or as a component unit that can be installed and replaced particularly easily, especially via a plug connection.

Figure 3:
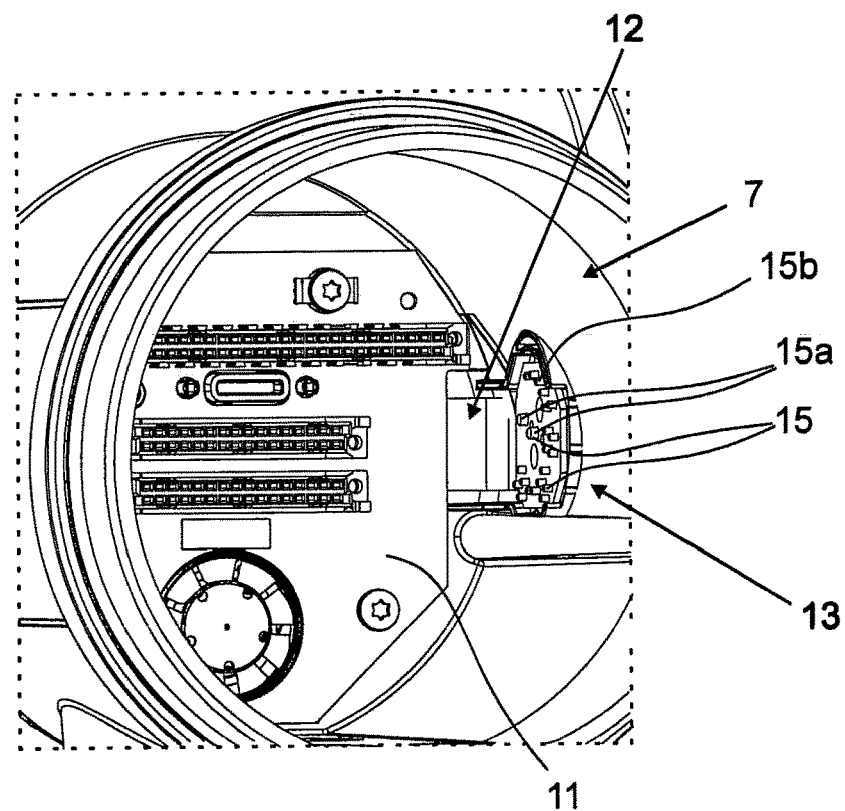
FIG. 3 is a perspective view a first embodiment of a second electronic device.

FIG. 3 shows a first embodiment of a second electronic device 11, which is arranged in an electronics space 7. The electronic device 11 is designed as a rigid-flex circuit board with two rigid circuit board parts. Slots for an electronics assembly 10 are arranged on a first rigid part of the printed circuit board. The second rigid circuit board part is designed as a terminal unit 13 for connection to a contacting unit 14. A flexible connection 12 is arranged between the two rigid printed circuit board parts, whereby in particular the conductor tracks of the flex-rigid printed circuit board represent a continuous connection of the two rigid printed circuit board parts and the flexible connection.

Figure 4:
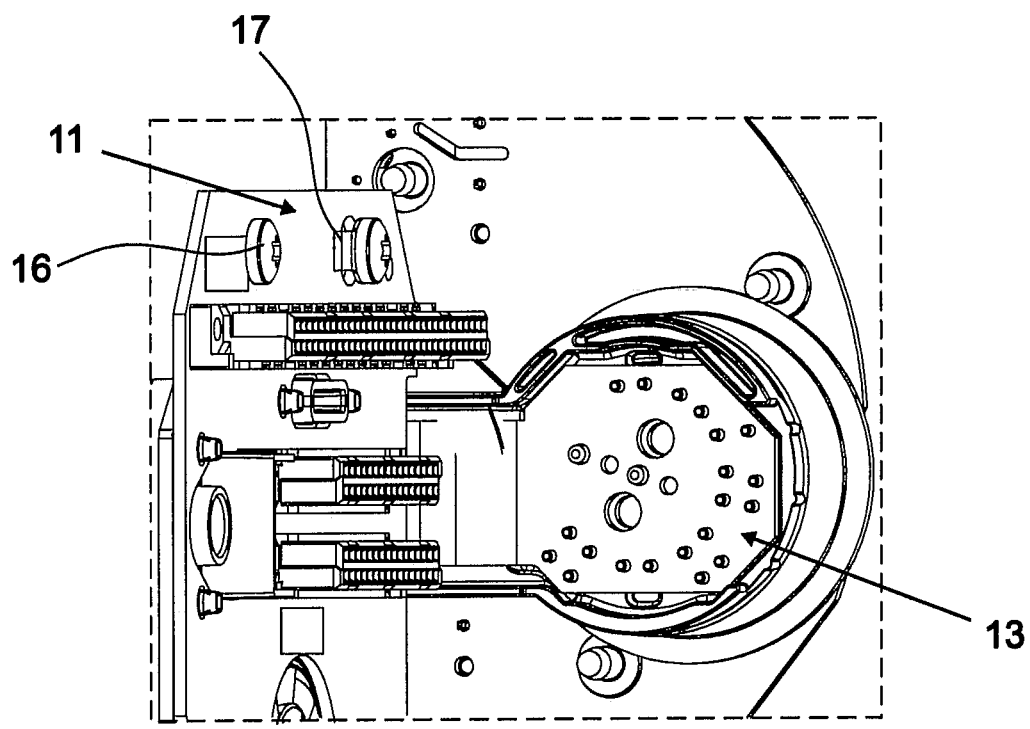
FIG. 4 is a perspective view of the first embodiment of a second electronic device.

The terminal unit 13 has connecting elements 15 in the form of network connecting elements 15a and signal connecting elements 15b, wherein the signal connecting elements 15b are arranged in two circles around the network connecting elements 15a, as shown in FIG. 4.

The connecting elements 15 are designed in such a way that they can be electrically conductively connected to the contacting unit 14 by means of a plug connection. The connecting elements 15 have a funnel-shaped design and can catch and center pin-like contact elements during connection.

The terminal unit 13 is arranged to float perpendicular in a holder to the joining direction of the connection between the terminal unit 13 and the contacting unit 14 and can thus adapt to the position of the contacting unit 14 during connection to the contacting unit 14. Overall, the connection between the connecting elements 15 and the contacting unit 14 is therefore self-centering.

FIG. 4 shows a further view of the embodiment of a second electronic device 11 illustrated in FIG. 3. The printed circuit board is connected to the transmitter housing 4 via a screw connection 16. A screw connection 16 is designed as a secure connection 17, via which the ground potential of the circuit board is connected to the housing 4. The terminal unit 13 has network connecting elements 15a and signal connecting elements 15b which are arranged in two circles around the network connecting elements 15a. In this case, the distance of the signal connecting elements 15b to the network connecting elements 15a corresponds to the standardized minimum distance for maintaining the air and creep resistance.

The signal connecting elements 15b are arranged in pairs. In this case, the distance between the signal connecting elements 15b arranged in the outer circle and the signal connecting elements 15b arranged in the inner circle at least partially falls below the standardized minimum distance for maintaining the air and creep resistance. Thus, the second electronic device 11 illustrated in FIG. 4 is only suitable for use in a non-hazardous environment. According to another embodiment, the minimum distance is maintained to ensure air and creep resistance between all signal connecting elements 15b and network connecting elements 15a. Such a design is also suitable for use in potentially explosive environments.

Figure 5:
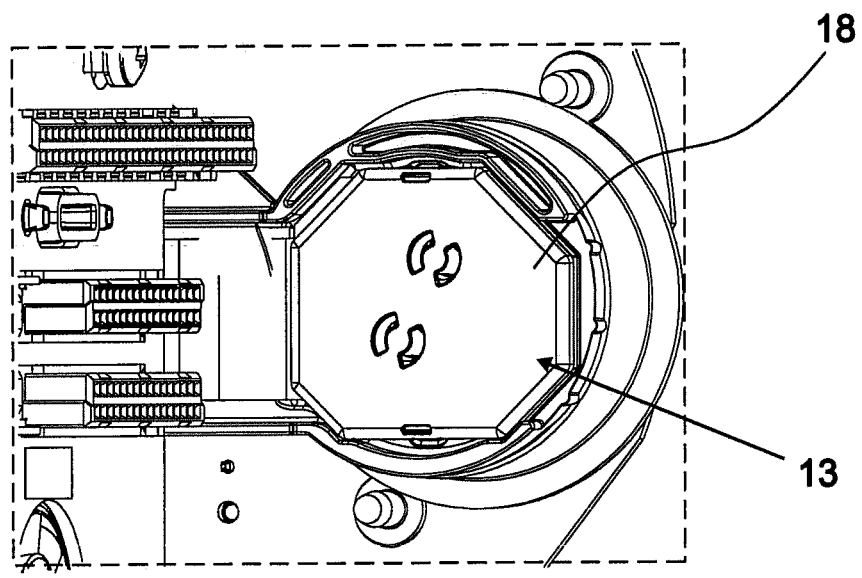
FIG. 5 is a perspective view the first embodiment of a second electronic device.

An embodiment of a terminal unit 13 is shown in FIG. 5, which is covered with an insulating material 18. The insulating material 18 is designed as a cap, which is connected via a latching connection to the terminal unit 13. The illustrated embodiment has increased security, in particular when opening the transmitter housing 4.

Figure 6:
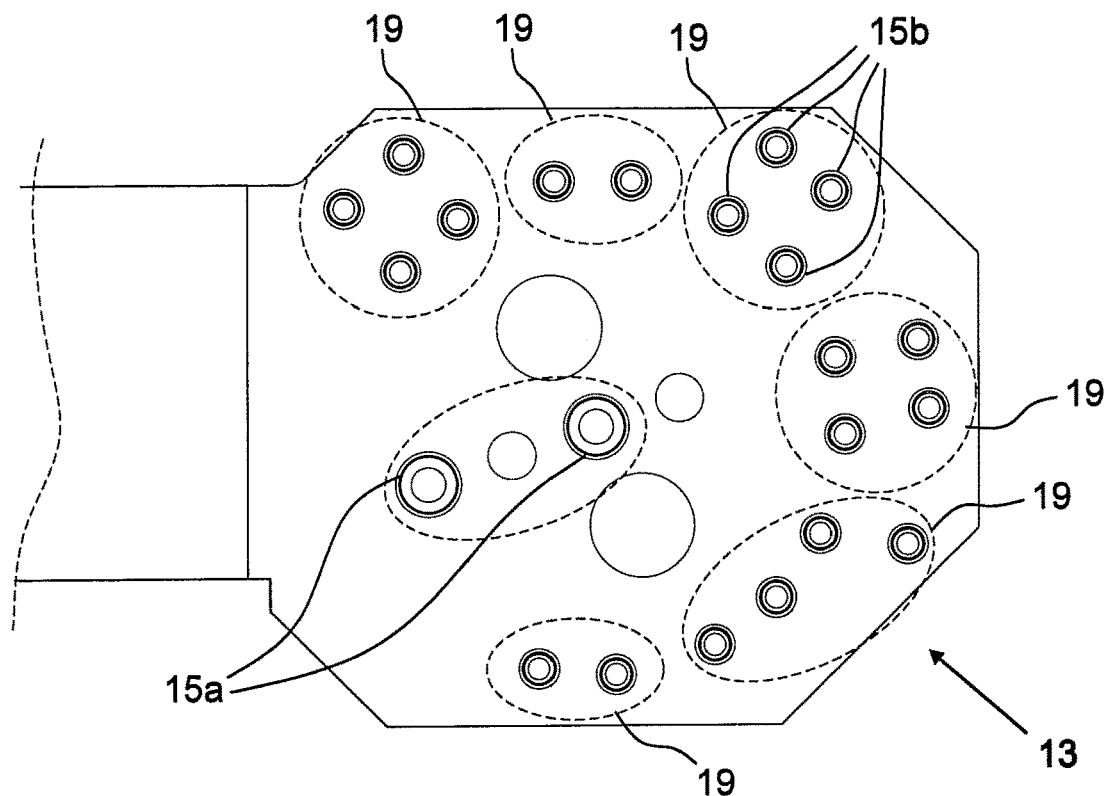
FIG. 6 is a plan view of an embodiment of a connection unit.

FIG. 6 also shows an embodiment of a terminal unit 13 having network connecting elements 15a and signal connecting elements 15b, wherein the signal connecting elements 15b are arranged in a circle around the network connecting elements 15a. The signal connecting elements 15b are combined to form circuit groups 19, so that advantageously interconnected conductor tracks can be guided close together.

Figure 7:
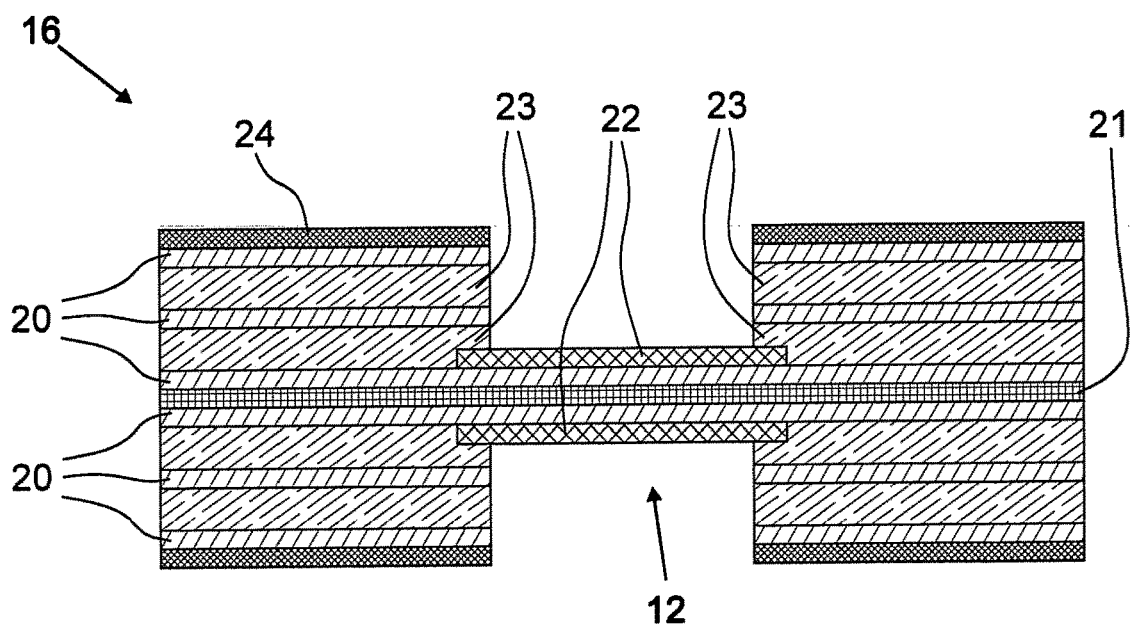
FIG. 7 is a sectional view of a configuration of a second electronic device

FIG. 7 shows the configuration of an embodiment of the rigid-flex circuit board arranged in the electronics space 7. The printed circuit board is designed as a multi-layer flex circuit board with internal conductor tracks. In the embodiment shown, the rigid printed circuit board parts each have six metallization layers 20 arranged one above the other. The flexible part 12 of the rigid-flex circuit board has two metallization layers 20, which are each covered with insulating material. A foil 21 made of flex polyimide with a thickness of about 50 microns is internally arranged, through which the flexible part 12 of the circuit board is bendable. The flexible part 12 of the rigid-flex circuit board is further covered by a polyimide protective layer 22 having a thickness of between 25 and 50 µm. Furthermore, the printed circuit board has intermediate layers 23 of pre-impregnated fiber material, each having a thickness between 250 microns and 600 microns. The rigid part of the printed circuit board has a solder cover 24.

Figures 8, 9:
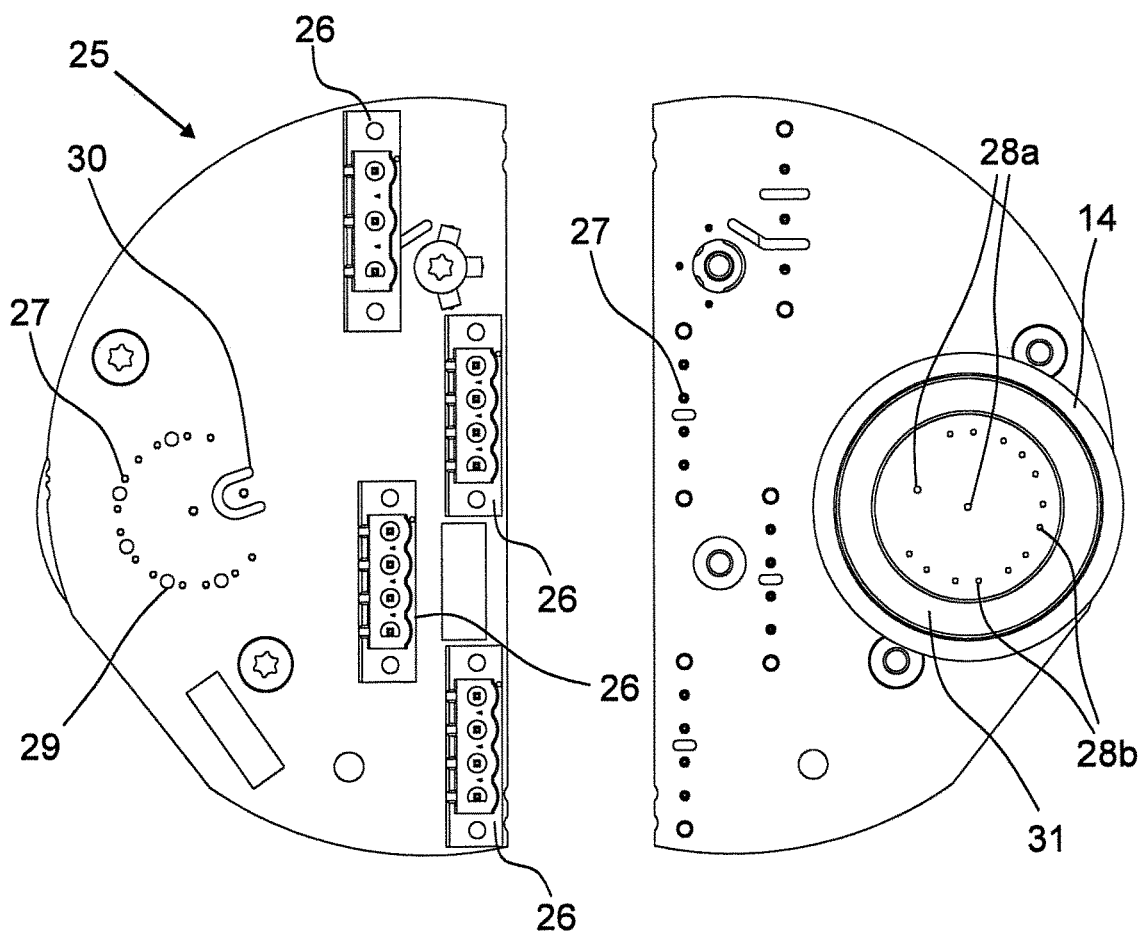
FIG. 8 is a plan view of a first embodiment of a first electronic device.
FIG. 9 is rear view of the first embodiment of a first electronic device.

FIGS. 8 and 9 show a first embodiment of a first electronic device 25 in the form of a printed circuit board, which is arranged in the terminal space 5 in the operating state. The printed circuit board has a semicircular design and is adapted in shape to the shape of the inner cross section of the terminal space 5. Terminals for the connection of supply and I/O lines are arranged on the printed circuit board. In addition, feedthrough contacts 27 are present, which are firmly connected to the contact elements 28 of the contacting unit 14, as shown below. In the illustrated embodiment, the contact elements 28 are soldered to the feedthrough contacts 27. In this respect, the circuit board and the contacting unit 14 can be handled as an assembly and, in particular, mounted as a unit and also replaced. To increase the distance between the feedthrough contacts 27 and the contact elements 28, circular holes 29 and a curved slot 30 are present in the circuit board.

FIG. 9 shows the printed circuit board shown in FIG. 8 in rear view. The illustration shows the side of the circuit board that faces the electronics space 7 in the operating state. In addition to the feedthrough contacts 27 for connection via the terminals 26, there is a contacting unit 14 in the form of an electrical feedthrough element with contact elements 28 in the form of network contact elements 28a and signal contact elements 28b. The signal contact elements 28b are arranged in such a circular manner around the network contact elements 28a that the distance between the network contact elements 28a and the signal contact elements 28b corresponds to the standardized minimum distance for maintaining the air and creep resistance. The requirements for the distance between the signal contact elements 28b to one another are lower. In the illustrated embodiment, the distances between the signal contact elements 28b are dimensioned such that the circuit board is suitable for use in potentially explosive environments. In addition, the feedthrough element has a protective collar 31, which increases the ignition protection safety.

Figure 10:
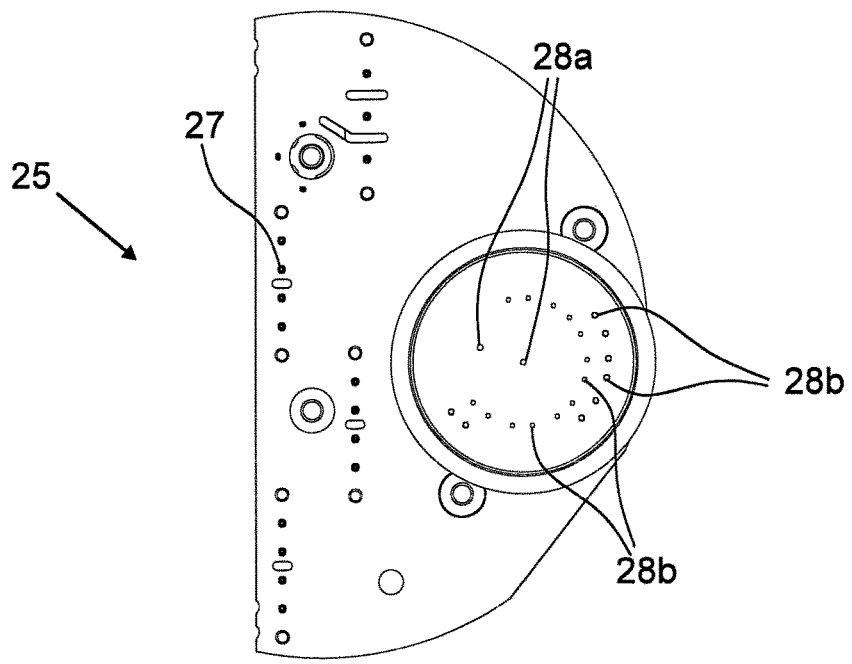
FIG. 10 is a plan view of a second embodiment of a first electronic device.

FIG. 10 shows a second embodiment of a first electronic device 25 in the form of a printed circuit board, which is arranged in the terminal space 5 in the operating state. In contrast to the embodiment illustrated in FIGS. 8 and 9, the signal contact elements 28b are arranged in a circular manner in two circles around the network contact elements 28a. In an advantageous manner, a particularly large number of transmitting elements are made available with this embodiment.

Figure 11:
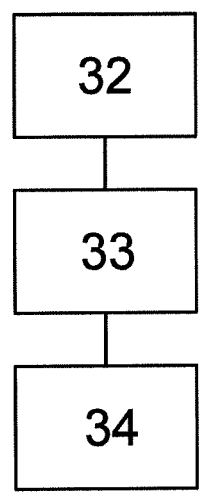
FIG. 11 is a flow chart of a first embodiment of the method according to the invention.

FIG. 11 shows a method 2 for producing a measuring device 1, wherein the measuring device 1 has a sensor 3 and a transmitter housing 4, wherein the transmitter housing 4 has a terminal space 5 and an electronics space 7 adjacent to the terminal space 5 and connected via a partition wall 6, wherein a first electronic device 25 is arranged in the terminal space 5 for the connection of supply and/or I/O lines and wherein a second electronic device 11 is arranged in the electronics space 7 with electronics for controlling the sensor 3, wherein the second electronic device 11 arranged in the electronics unit 7 has a terminal unit 13, wherein a contacting unit 14 is provided in the form of an electrical feedthrough element that is firmly connected to the first electronic device 25, wherein the contacting unit 14 has contact elements 28 in the form of network contact elements 28a and/or signal contact elements 28b for transmitting electrical signals and wherein the terminal unit 13 has connecting elements 15 in the form of network connecting elements 15a and/or signal connecting elements 15b.

The method comprises the following steps:
- installing 32 the second electronic device 11 in the electronics space 7, wherein the terminal unit 13 is arranged to float,
- installing 33 the first electronic device 25 in the terminal space 5, wherein the contacting unit 14 is removably inserted into the partition wall 6,
- wherein the contacting unit 14 is connected to the terminal unit 13 by installing the first electronic device 25,
- wherein the terminal unit 13 adapts 34 by self-centering to the position of the contacting unit 14.

The illustrated method has the advantage that the production of a measuring device 1, in particular the connection of the electrical feedthrough element to the terminal unit 13 is particularly simple, whereby both the production and replacement of the assembly, in particular, of the electrical feedthrough element and the first electronic device 25 is particularly easy.

What is claimed is:

1. Measuring device, comprising:
   at least one sensor,
   at least one first electronic device for the connection of supply and/or I/O lines,
   at least one second electronic device, and
   at least one transmitter housing, the transmitter housing having at least one terminal space and an electronics space adjacent to the terminal space and connected via a partition wall,
   wherein the at least one first electronic device is arranged in the terminal space,
   wherein the at least one second electronic device is arranged in the electronics space with electronics for controlling the at least one sensor,
   wherein the first electronic device and the second electronic device are electrically conductively connected to one another via a contacting unit,
   wherein the second electronic device has a terminal unit which is connected to the contacting unit via a plug connection that has a joining direction,
   wherein the terminal unit is fixedly arranged in the joining direction and is arranged to float, being movable in directions perpendicular to the joining direction such that the position of the terminal unit is able to move to adapt to the position of the contacting unit when connecting the terminal unit to the contacting unit,
   wherein the terminal unit has connecting elements in the form of at least one of the network connecting elements or signal connecting elements for transmitting electrical signals,
   wherein the connecting elements are at least partially formed as funnel-shaped sockets, and
   wherein the second electronic device is an at least partially bendable printed circuit board.

2. Measuring device according to claim 1, wherein the terminal unit has means for increasing the distance between the network connecting elements and the signal connecting elements or between the signal or network connecting elements relative to one another.

3. Measuring device according to claim 1, wherein the signal connecting elements are arranged in a circular manner around at least one network connecting element.

4. Measuring device according to claim 1, wherein the signal connection elements are arranged around the at least one network connection element in such a manner that the distance between the at least one network connecting element and the signal connecting elements corresponds at least to a standardized minimum distance for maintaining air and creep resistance.

5. Measuring device according to claim 1, wherein the signal connecting elements are combined to form at least one circuit group, and wherein the at least one circuit group has at least two signal connecting elements.

6. Measuring device according to claim 5, wherein within at least one circuit group or between at least two circuit groups, at least one distance between two signal connecting elements falls below a standardized minimum distance to maintain air and creep resistance.

7. Measuring device according to claim 1, wherein the terminal unit is covered with an insulating material.

8. Measuring device according to claim 1, wherein the at least partially bendable printed circuit board has at least two rigid printed circuit board parts and at least one bendable part, wherein the bendable part connects the at least two rigid parts together, wherein at least one rigid part is a terminal unit and wherein at least one rigid part is a receiving unit for the electronics arranged in the electronics space and wherein the terminal unit and the receiving unit are arranged at an angle relative to each other.

9. Measuring device according to claim 8, wherein the at least partially—bendable printed circuit board is a multilayer printed circuit board with internal conductor tracks.

10. Transmitter housing, comprising:
    at least one terminal space,
    an electronics space adjacent to the terminal space and connected via a partition wall,
    at least one first electronic device arranged in the terminal space for connection of at least one of supply lines or I/O lines,
    at least one second electronic device with electronics for controlling the sensor arranged in the electronics space,
    a contacting unit electrically conductively connected connecting the first electronic device and the second electronic device to one another,
    wherein the second electronic device has a terminal unit which is connected to the contacting unit via a plug connection that has a joining direction,
    wherein the terminal unit is fixedly arranged in the joining direction and able to float, being movable in directions perpendicular to the joining direction such that the position of the terminal unit is able to move to adapt to the position of the contacting unit when connecting to the contacting unit,
    wherein the transmitter housing is adapted for use in a measuring device having at least one sensor,
    wherein the terminal unit has connecting elements in the form of at least one of the network connecting elements or signal connecting elements for transmitting electrical signals,
    wherein the connecting elements are at least partially formed as funnel-shaped sockets, and
    wherein the second electronic device is an at least partially bendable printed circuit board.

11. Method for producing a measuring device having at least one sensor and at least one transmitter housing, wherein the transmitter housing has at least one terminal space and an electronics space adjacent to the terminal space and connected via a partition wall, wherein at least a first electronic for the connection of supply and/or I/O lines is arranged in the terminal space and wherein at least a second electronic device is arranged in the electronics space with electronics for controlling the sensor, wherein the second electronic device arranged in the electronics space has a terminal unit with connecting elements in the form of network connecting elements and/or signal connecting elements, and a contacting unit which is fixedly connected to the first electronic device, has contact elements in the form of network contact elements and/or signal contact elements for transmitting electrical signals, wherein the connecting elements are at least partially formed as funnel-shaped sockets, the method comprises the following steps:
installing the second electronic device in the electronics space, wherein the terminal unit is arranged to float due to use of an at least partially bendable printed circuit board as the second electronic device,
installing the first electronic device in the terminal space, the contacting unit being removably inserted into the partition wall,
connecting the contacting unit to the terminal unit by installing the first electronic device,
adapting the terminal unit to the position of the contacting unit by a self-centering movement in a direction perpendicular to an insertion direction of the contacting unit into the terminal unit as the contact elements are inserted into the funnel-shaped sockets.

* * * * *